United States Patent
Arora et al.

(10) Patent No.: US 10,541,925 B2
(45) Date of Patent: Jan. 21, 2020

(54) NON-DSR DISTRIBUTED LOAD BALANCER WITH VIRTUALIZED VIPS AND SOURCE PROXY ON LOAD BALANCED CONNECTION

(71) Applicant: Microsoft Technology Licensing, LLC, Redmond, WA (US)

(72) Inventors: Vikrant Arora, Redmond, WA (US); Dinesh Kumar Govindasamy, Redmond, WA (US); Madhan Raj Mookkandy, Redmond, WA (US); Sandeep Bansal, Redmond, WA (US); Nicholas D. Wood, Woodinville, WA (US); George Kudrayvtsev, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 15/851,120

(22) Filed: Dec. 21, 2017

(65) Prior Publication Data
US 2019/0068505 A1 Feb. 28, 2019

Related U.S. Application Data

(60) Provisional application No. 62/552,806, filed on Aug. 31, 2017.

(51) Int. Cl.
*H04L 29/12* (2006.01)
*H04L 12/803* (2013.01)
(Continued)

(52) U.S. Cl.
CPC ............ *H04L 47/125* (2013.01); *H04L 45/72* (2013.01); *H04L 47/283* (2013.01);
(Continued)

(58) Field of Classification Search
CPC ..... H04L 63/0263; H04L 63/20; H04L 69/22; H04L 12/4641; H04L 41/5045;
(Continued)

(56) References Cited

U.S. PATENT DOCUMENTS

2018/0262459 A1* 9/2018 Wang .................... H04L 61/103
2018/0302343 A1* 10/2018 Lokman .................. H04L 49/70
(Continued)

OTHER PUBLICATIONS

"MAC Address", Retrieved from: https://en.wikipedia.org/w/index.php?title=MAC_address&oldid=325602626, Nov. 13, 2009, 3 Pages.
(Continued)

*Primary Examiner* — Sai Aung
(74) *Attorney, Agent, or Firm* — Ray Quinney & Nebeker; Tiffany Healy

(57) ABSTRACT

Methods and devices for load balancing of connections may include receiving, at a management component on a container host on a computer device, at least one data packet based on a destination IP address of the data packet that corresponds to a plurality of container hosts. The methods and devices may include selecting a destination container from at least one container host on the computer device and other computer devices in communication with the computer device over a virtual network to balance a data load and translating the source IP address of the at least one data packet to a local IP address of the container host. The methods and devices may include changing the destination IP address of the at least one data packet to a virtual IP address of the selected destination container so that the at least one data packet is transformed to a proxy data packet.

17 Claims, 5 Drawing Sheets

(51) Int. Cl.
*H04L 12/721* (2013.01)
*H04L 12/841* (2013.01)
*H04L 12/813* (2013.01)

(52) U.S. Cl.
CPC ...... *H04L 61/2528* (2013.01); *H04L 61/6013* (2013.01); *H04L 47/20* (2013.01)

(58) Field of Classification Search
CPC ............... H04L 61/256; H04L 61/2571; H04L 61/2585; H04L 63/0236; H04L 63/0272
See application file for complete search history.

(56) References Cited

U.S. PATENT DOCUMENTS

2019/0007342 A1* 1/2019 Wang .................. H04L 49/3009
2019/0007364 A1* 1/2019 Wang .................... H04L 61/103

OTHER PUBLICATIONS

"IP Address", Retrieved from: https://en.wikipedia.org/w/index.php?title=IPaddress&oldid=797307305, Aug. 26, 2017, 11 Pages.

"Virtual IP Address", Retrieved from: https://en.wikipedia.org/w/index.php?title=VirtualIP_address&oldid=734322971, Aug. 13, 2016, 2 Pages.

Church, Mark, "Docker Reference Architecture: Designing Scalable, Portable Docker Container Networks", Retrieved from: https://success.docker.com/api/articles/networking/pdf, Jun. 20, 2017, 37 Pages.

"International Search Report and Written Opinion Issued in PCT Application No. PCT/US2018/038714", dated Sep. 27, 2018, 14 Pages.

* cited by examiner

US 10,541,925 B2

NON-DSR DISTRIBUTED LOAD BALANCER WITH VIRTUALIZED VIPS AND SOURCE PROXY ON LOAD BALANCED CONNECTION

RELATED APPLICATION

This application claims priority to U.S. Application No. 62/552,806 titled "Non-DSR Distributed Load Balancer With Virtualized VIPS and Source Proxy on Load Balanced Connection," filed Aug. 31, 2017, which is incorporated herein by reference in its entirety.

BACKGROUND

The present disclosure relates to load balancing.

Generally, computer devices route data packets on the TCP/IP layer of the computer devices by selecting a destination of the data packets and/or trying to balance the load of the data packets among several nodes in communication over a network. As data packets are processed higher in the stack, processing times may increase.

Thus, there is a need in the art for improvements in load balancing.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, a management component associated with a virtual switch of the computer device in communication with the memory and the processor, wherein the management component is operable to: receive at least one data packet at a container host on a computer device based on a destination IP address of the data packet, wherein the destination IP address corresponds to a plurality of container hosts; select, at the data link layer of the container host, a destination container from at least one container host on the computer device and other computer devices in communication with the computer device over a virtual network to balance a data load; translate, at the data link layer, the source IP address of the at least one data packet to a local IP address of the container host; and change, at the data link layer, the destination IP address of the at least one data packet to a virtual IP address of the selected destination container so that the at least one data packet is transformed to a proxy data packet having a destination address of the virtual IP address of the destination container and a source address of the local IP address of the container host.

Another example implementation relates to a method for load balancing of connections. The method may include receiving, at a management component on a container host on a computer device, at least one data packet based on a destination IP address of the data packet, wherein the destination IP address corresponds to a plurality of container hosts. The method may also include selecting, at the data link layer of the container host, a destination container from at least one container host on the computer device and other computer devices in communication with the computer device over a virtual network to balance a data load. The method may also include translating, at the data link layer, the source IP address of the at least one data packet to a local IP address of the container host. The method may also include changing, at the data link layer, the destination IP address of the at least one data packet to a virtual IP address of the selected destination container so that the at least one data packet is transformed to a proxy data packet having a destination address of the virtual IP address of the destination container and a source address of the local IP address of the container host.

Another example implementation relates to computer-readable medium storing instructions executable by a computer device. The computer-readable medium may include at least one instruction for causing the computer device to receive at least one data packet at a container host on a computer device based on a destination IP address of the data packet, wherein the destination IP address corresponds to a plurality of container hosts. The computer-readable medium may include at least one instruction for causing the computer device to select, at the data link layer of the container host, a destination container from at least one container host on the computer device and other computer devices in communication with the computer device over a virtual network to balance a data load. The computer-readable medium may include at least one instruction for causing the computer device to translate, at the data link layer, the source IP address of the at least one data packet to a local IP address of the container host. The computer-readable medium may include at least one instruction for causing the computer device to change, at the data link layer, the destination IP address of the at least one data packet to a virtual IP address of the selected destination container so that the at least one data packet is transformed to a proxy data packet having a destination address of the virtual IP address of the destination container and a source address of the local IP address of the container host.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for load balancing of connections among a plurality of computer devices, containers, virtual machines, or any runtime environment in communication over a virtual data network at a data link layer (e.g., Layer 2). The devices and methods may include, for example, container hosts operating one or more containers on each computer device. Containers may include, for example, self-contained applications independent from one another and other processes executing outside of the containers on the computer devices.

The container hosts may include a virtual switch and a management component associated with the virtual switch operable to route data packets received from a client from the container host to a selected container destination for processing. The management component may apply one or more load balancing rules to determine which container may receive the data packets so that data packets may be distributed across the containers of the virtual network.

Additionally, the management component may act as a proxy for the client and efficiently exchange packet-related communications with the containers using virtualized IP addresses at Internet Protocol Layer 2 (e.g., the data link layer). In particular, the management component may transform the source IP address of the client that transmitted the data packet to a localized IP address assigned to the container host. The localized IP address may not be visible outside of the data link layer (or Layer 2). As such, the localized IP address for the container host may be fully virtualized and not configured in the IP layer (e.g., Layer 3) or the transport layer (e.g., Layer 4) of the container host, thereby avoiding upper layer processing.

In addition, the management component may transform the destination IP address of the data packet to the virtual IP address of the selected destination container for transmission of the data packet to the destination container. As such, the management component may distribute the received data packets across any container operating on container hosts in communication over the virtual network using Layer 2 source and destination addressing.

The management component may receive a corresponding response packet from the selected destination container and may apply one or more rules to transform the source and destination addressing of the response packet for transmission back to the client.

In other words, the devices and methods perform the load balancing decisions in Layer 2, instead of Layer 3. In addition, the devices and methods perform a proxy of the source IP in Layer 2. By performing distributed load balancing and proxy message exchange at the data link layer of the network of container hosts, system processing may be improved by reducing a number of CPU cycles needed to process each data packet. Moreover, data throughput may be increased.

Figure 1:
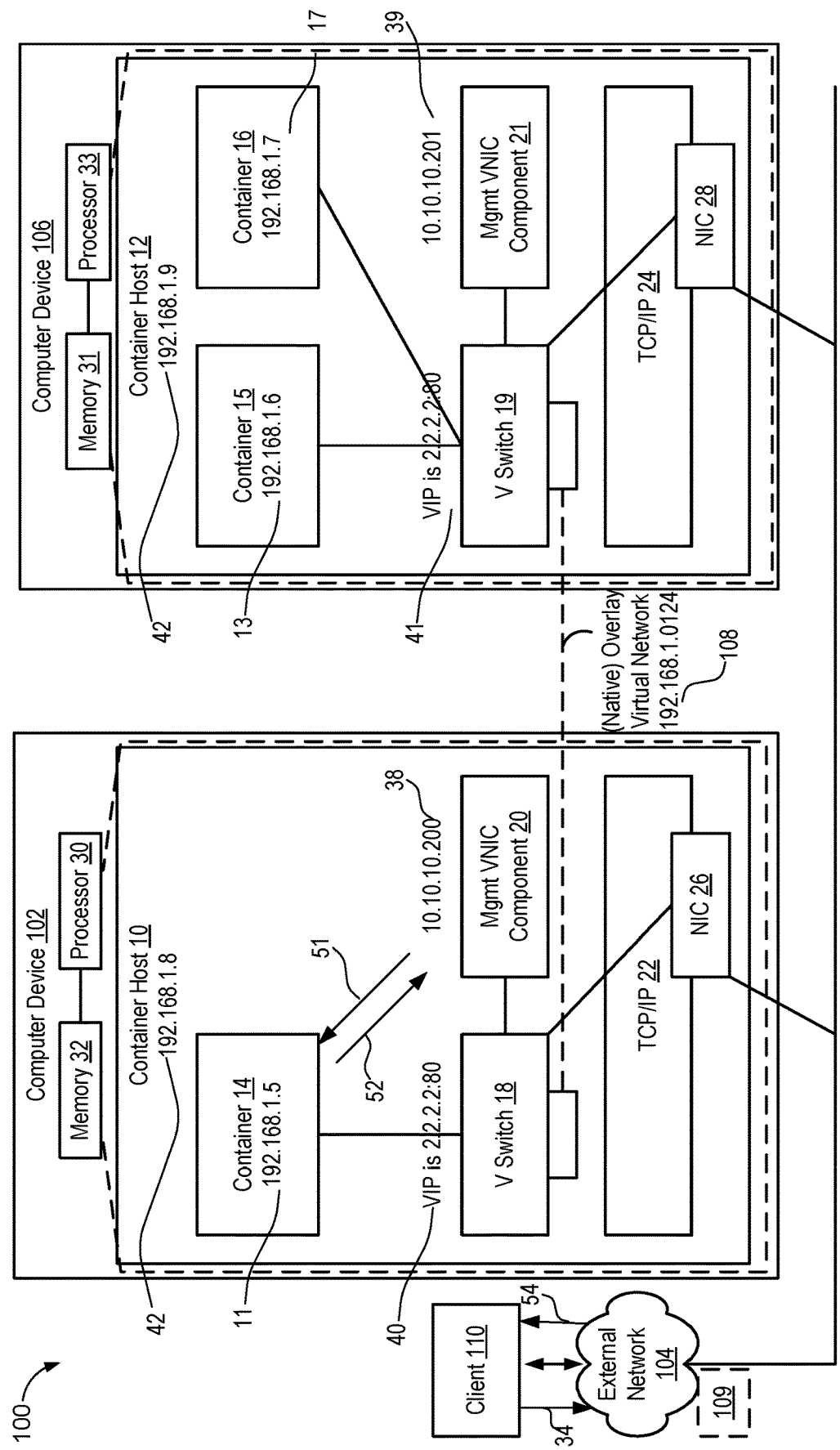
FIG. 1 is a schematic block diagram of example computer devices in accordance with an implementation of the present disclosure.

Referring now to FIG. 1, illustrated is an example load balancing system 100 that may distribute data packets 34 received from one or more clients 110 in communication with computer devices 102, 106 through external network 104. In an implementation, system 100 may use non-direct server return (DSR) distributed load balancing to balance data packets 34 received from one or more clients 110. The load balancers may be distributed at all the nodes in communication over the virtual network 108. In an example, system 100 may include one or more computer devices 102, 106 in communication over the virtual network 108. Each computer device 102, 106 may include a container host 10, 12, respectively, executed by processors 30, 33 and/or memories 31, 32 of computer devices 102, 106. Memories 31, 32 may be configured for storing data and/or computer-executable instructions defining and/or associated with container hosts 10, 12, and processors 30, 33 may execute container hosts 10, 12. An example of memories 31, 32 can include, but is not limited to, a type of memory usable by a computer, such as random access memory (RAM), read only memory (ROM), tapes, magnetic discs, optical discs, volatile memory, non-volatile memory, and any combination thereof. An example of processors 30, 33 can include, but is not limited to, any processor specially programmed as described herein, including a controller, microcontroller, application specific integrated circuit (ASIC), field programmable gate array (FPGA), system on chip (SoC), or other programmable logic or state machine. Computer devices 102, 106 may include any mobile or fixed computer device, which may be connectable to a network. Computer devices 102, 106 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Container hosts 10, 12 may operate one or more containers 14, 15, and 16. Containers 14, 15, and 16 may include, for example, self-contained applications independent from one another, but which may share computer device resources (e.g., memory 32, processor 30, and/or an operating system implemented by memory 32 and processor 30). Moreover, containers 14, 15, and 16 may have no knowledge of other applications and/or processes executing outside of the containers 14, 15, and 16 on computer devices 102, 106, and each container may share the host operating system, including the kernel and libraries. Each container 14, 15, and 16 may be identified by a container address 11, 13, and 17 so that data packet 34 may be routed to a respective container 14, 15, and 16 by using the container address 11, 13, and 17 as the destination address of the packet, for example, in the packet header. Container addresses 11, 13, and 17 may be assigned to container hosts 10 and 12 but may not be visible anywhere else in the network. For example, clients 110 may not have any knowledge of container addresses 11, 13, and 17. In an implementation, virtual machines (VMs) may be used instead of container hosts 10, 12. In addition, any computer network resource that has its own IP address may be used instead of container hosts 10, 12.

In an implementation, a routing component 109, such as a router, operating on external network 104 may receive data packet 34 from client 110 and decide which computer device 102, 106 or container host 10, 12 receives data packet 34. It should be noted that this may be considered an initial level of load balancing. For example, each container host 10, 12 may be associated with a virtualized address such that data packet 34 may identify an address of each container host 10, 12. In response, routing component 109 may use the address to deliver the data packet 34 to either container host 10 via network interface component (NIC) 26 or to container host 12 via NIC 28. For purposes of this example, routing component 109 delivers data packet 34 to NIC 26, which may transmit data packet 34 to the virtual switch 18 of container host 10. Virtual switch 18 may communicate with a management component 20 which may perform the load balancing and select one of containers 14, 15, and 16 for receiving data packet 34 to in order to balance the data load over the containers 14, 15, and 16 and/or container hosts 10, 12 of the virtual network 108. It should be noted that NIC 28, virtual switch 19, and management component 21 may perform similar functions as NIC 26, virtual switch 18, and management component 20 for any data packets delivered to container host 12.

For example, again referring to container host 10, management component 20 may generate a proxy data packet 51 having Layer 2 virtualized source and destination addresses to send to container 14 (when container 14 is selected based on the load balancing) and may receive a proxy data packet response 52 from container 14 in response. In addition, management component 20 may translate the Layer 2 virtualized source and destination addresses back to the original addressing to generate a data packet response 54 to transmit to client 110 in response to data packet 34. As such, the management component 20 may act as a proxy and interact with the network of containers 14, 15, 16 to perform load balancing of data packet 34 using Layer 2 addressing and processing.

By performing the load balancing at Layer 2 (data link layer) and using the Layer 2 to create proxy addressing, e.g., changing the source VIP address to a local IP address of container host 10 and the destination IP address to the destination VIP address of the selected destination container, the management component 20 enables use of the data link layer instead of the TCP/IP layer 22, 24, thereby reducing the processing costs associated with load balancing connections. For example, the number of CPU cycles needed may be reduced, e.g., by eliminating upper layer processing. Moreover, by performing the load balancing on the data link layer, throughput may be increased. Further, by avoiding use of physical IP addresses, container host 10 operating management component 20 enables compatibility with platforms that do not support DSR, and also improves scalability.

Figure 2:
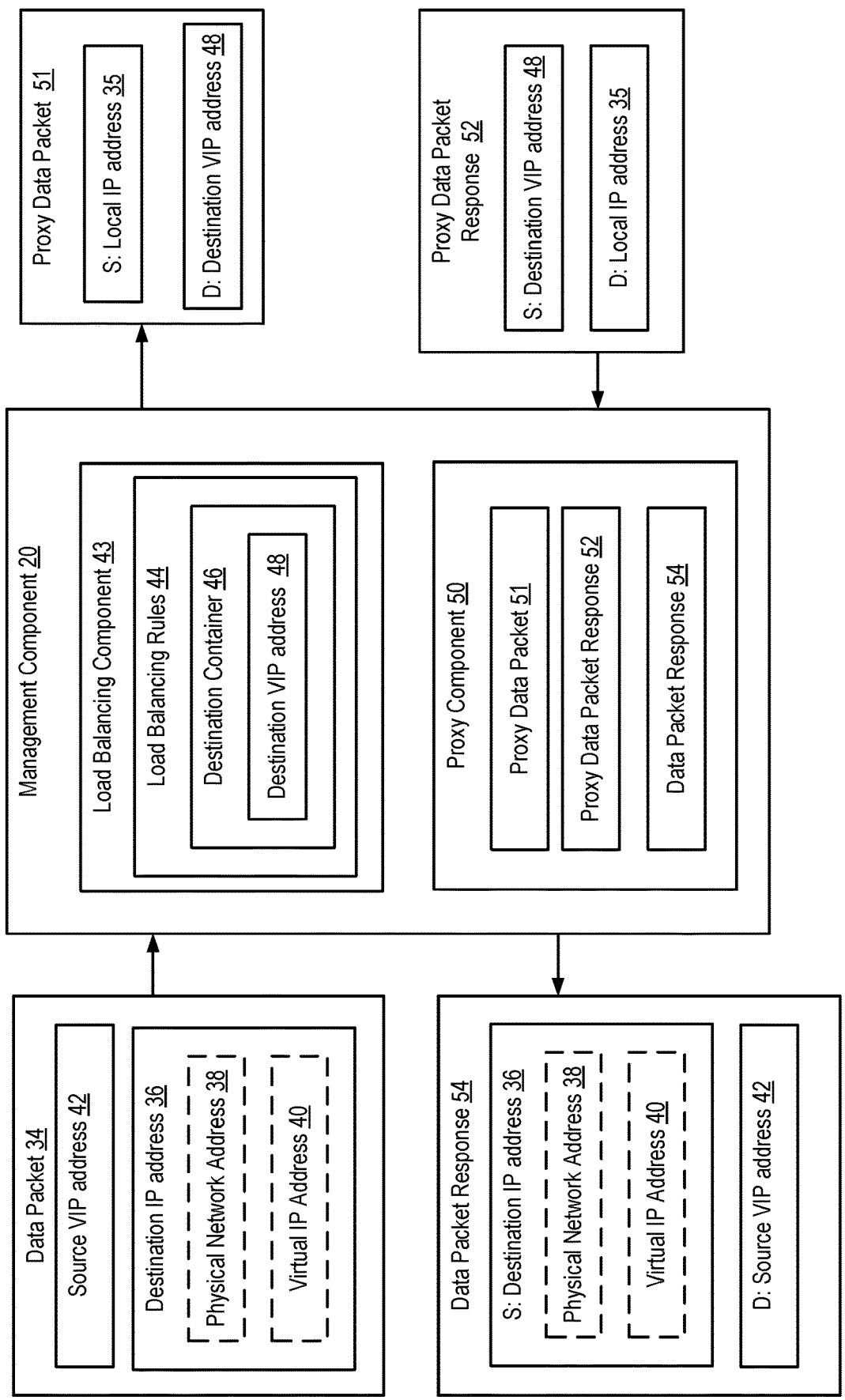
FIG. 2 is a schematic block diagram of an example management component operating on a computer device in accordance with an implementation of the present disclosure.

Referring now to FIG. 2, illustrated is a more detailed example management component 20 used with container host 10 to perform load balancing of connections and to act as an intermediary or proxy for client 110 in communications with one or more containers 14, 15, and 16 in a virtual network. While the below description is related to management component 20 associated with container host 10, it should be noted that management component 21 associated with container host 12 may also perform similar functions. In an implementation, management component 20 may be implemented within a virtual switch 18 of container host 12 and/or in communication with virtual switch 18. Further, management component 20 may operate on a data link layer (e.g., Layer 2) of the data stack of the container host 10.

Management component 20 may receive one or more data packets 34 from client 110 in communication with external network 104, such as the Internet. The data packets 34 may include a source VIP address 42 that may be used by management component 20 to identify client 110 as the source that transmitted the data packet 34. In addition, the data packets 34 may include a destination IP address 36 that identifies the container host 10 as the destination of the data packet 34. The destination IP address 36 may be a physical network address 38 of the container host 10. In addition, the destination IP address 36 may be a virtual IP address 40 of the container host 10, where such virtual address may be shared with other container hosts, such as container host 12, to enable data packets to be delivered generally to the virtual network of container hosts. As such, management component 20 may support any type of IP address associated with the container hosts. In an implementation, when management component 20 receives any packet with destination IP address 36 generally associated with the virtual network of container hosts, management component 20 may automatically load balance the received packet.

Management component 20 may include a load balancing component 43 operable to distribute the data packet 34 to any of the container hosts 10, 12 in communication over the virtual network 108. Load balancing component 43 may apply one or more load balancing rules 44 to the received data packets 34 to identify a destination container 46 to receive each data packet 34. Example load balancing rules 44 may include, but are not limited to, load balancing relative to a threshold (e.g., based on memory or CPU usage meeting a threshold), load balancing relative to an average usage as compared to other nodes in the cluster (e.g., in this case, other containers 14, 15, 16 and/or other container hosts), source hash load balancing to keep users (e.g., client 110) or groups of users on the same containers 14, 15, 16 and/or other container hosts 10, 12 based on the IP addresses of the users, round robin load balancing, and a least number of connections load balancing (e.g., using a lowest number or connections possible when balancing the load). For example, destination container 46 may be selected from containers 14, 15, and 16 (FIG. 1). The load balancing rules 44 may distribute the data load of data packets 34 among any of the containers 14, 15, 16 running inside container hosts 10 and/or 12. As such, the load may be distributed across any of the container hosts 10, 12 in communication over the virtual network 108.

Load balancing component 43 may communicate with a proxy component 50 operable to translate the source and destination addresses of data packet 34 into a Layer 2 proxy source address and a Layer 2 proxy destination address to generate a proxy data packet 51 to transmit to the destination container 46. In an implementation, proxy component 50 may include a network address translator (NAT) operable to translate the original source and destination addresses of data packets into virtual addresses specific to Layer 2 for efficient communication within the virtual network. For example, proxy component 50 may convert the source VIP address 42 of data packet 34 to a proxy source address, such as a local IP address 35 of container host 10. Local IP address 35 may be a virtual address specific to the data link layer (e.g., Layer 2), that is not a real physical address. For instance, local IP address 35 may be a dynamic IP address (DIP). As such, local IP address 35 may be fully virtualized within the data link layer and may not be configured in the IP layer (e.g., Layer 3) or the transport layer (e.g., Layer 4) of any of the container hosts 10, 12. Proxy data packet 51 may include local IP address 35 as the source address of proxy data packet 51 so that when management component 20 transmits proxy data packet 51 to the selected destination container 46, destination container 46 will identify container host 10 as the source of the proxy data packet 51.

In addition, proxy component 50 may convert the destination IP address 36 of the received data packet 34 to a proxy destination address, e.g., the destination VIP address 48 of the selected destination container 46. For instance, destination VIP address 48 also may be a dynamic IP address (DIP). Proxy component 50 includes destination VIP address 48 in the proxy data packet 51 so that the proxy data packet 51 may be routed to the destination container 46 using Layer 2. In other words, proxy component 50 replaces the original source and destination address of the received data packet 34 with a new, virtual network Layer 2 addressing scheme to transform the received data packet 34 into the proxy data packet 51 transmitted by the management component 20. Replacing the original destination IP address 36 for data packets 34 with a proxy destination address, e.g., the destination VIP address 48, allows any destination IP address 36 associated with container hosts 10, 12 to be used as a virtual IP address that can be routed to any container 14, 15, and 16 communicating over the virtual network 108. Further, replacing the source VIP address 42 of data packet 34 with the local IP address 35 of container host 10 enables management component 20 to act as an intermediary for client 110 and perform non-DRS distributed load balancing using Layer 2 addressing and processing.

When the destination container 46 is finished processing the proxy data packet 51, the destination container 46 may provide a proxy data packet response 52 back to management component 20. The proxy data packet response 52 may identify the destination VIP address 48 of the selected destination container 46 as the source of the proxy data packet response 52 and may identify the local IP address 35 of container host 10 as the destination of the proxy data packet response 52.

Proxy component 50 may receive the proxy data packet response 52 and may apply one or more stateful rules that remember the changes applied to the destination IP address 36 and the source VIP address 42 of the original data packet 34 received from client 110 so that a data packet response 54 may be transmitted back to client 110. Proxy component 50 may generate the data packet response 54 to have the destination IP address 36 of container host 10 as the source address of the data packet response 54 and the source VIP address 42 of client 110 as the destination address. As such, management component 20 may configure and transmit the data packet response 54 so that it may be routed back to the specific client, e.g., client 110 in this case, that originally transmitted the data packet 34 to the container hosts 10, 12.

By performing the load balancing and using the data link layer to create proxy addressing, e.g., changing the source VIP address 42 to a local IP address 35 of container host 10 and the destination IP address 36 to the destination VIP address 48 of the selected destination container 46, the management component 20 enables use of Layer 2, e.g., the data link layer, instead of the TCP/IP layer 22, 24, thereby reducing the processing costs associated with load balancing connections. For example, the number of CPU cycles needed may be reduced, e.g., by eliminating upper layer processing. Moreover, by performing the load balancing of connections on the data link layer, throughput may be increased. Further, by avoiding use of physical IP addresses, container host 10 operating management component 20 enables compatibility with platforms that do not support DSR, and also improves scalability.

Figure 3:
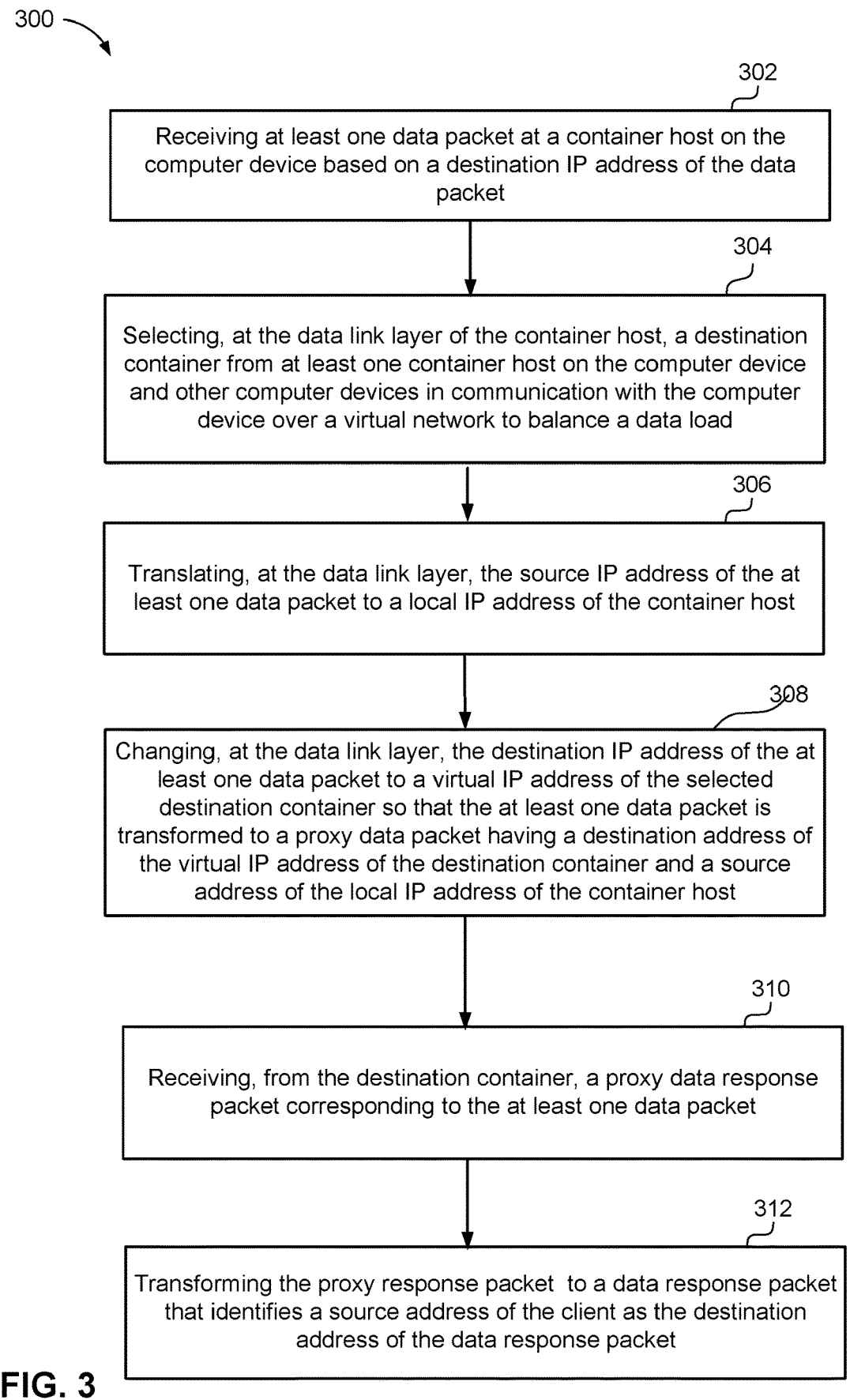
FIG. 3 is an example method flow for load balancing of connections in accordance with an implementation of the present disclosure.
Figure 4:
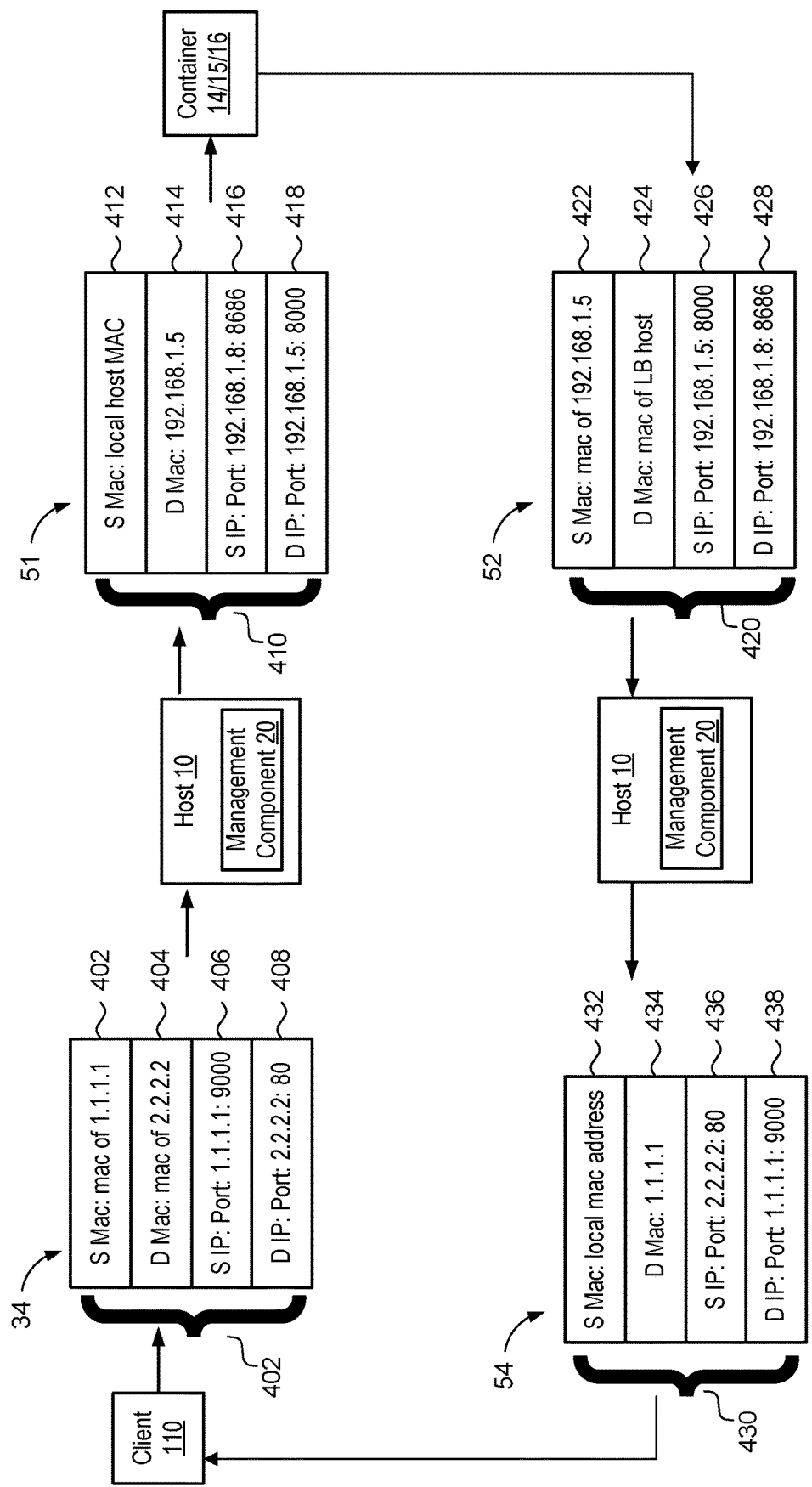
FIG. 4 illustrate example changes to addressing formats that occur as an example of load balancing in accordance with an implementation of the present disclosure.

Referring now to FIGS. 3 and 4, an example method 300 (FIG. 3) is a general method that may be used by management component 20 or 21 (FIG. 1) of computer device 102 or 106 (FIG. 1) to load balance one or more data packets 34 (FIG. 2) to one of the containers 14, 15, 16 for processing, which is discussed in combination with example changes to source and destination addressing formats (FIG. 4) that occur during the execution of method 300.

At 302, method 300 may include receiving at least one data packet at a container host on the computer device based on a destination IP address of the data packet. For example, in an implementation, management component 20 may receive one or more data packets 34 from client 110 in communication with external network 104, such as the Internet. The data packets 34 may include source VIP address 42 that may be used by management component 20 to identify client 110 that transmitted the data packet 34. In addition, the data packets 34 may include destination IP address 36 that identifies one or more container hosts 10, 12 communicating on the network. The destination IP address 36 may be a physical network address 38 of the container host 10, or a virtual IP address 40 of the container host 10 (e.g., such that it may be shared by other container hosts, e.g., container host 12, on the network). As such, management component 20 may support any IP address associated with the container hosts 10, 12.

At 304, method 300 may include selecting, at the data link layer of the container host, a destination container from at least one container host on the computer device and other computer devices in communication with the computer device over a virtual network to balance a data load. For example, in an implementation, management component 20 may include a load balancing component 43 operable to distribute the data load across any of the container hosts 10, 12 and/or containers 14, 15, 16 in communication over the virtual network 108. Load balancing component 43 may apply one or more load balancing rules 44 to the received data packets 34 to identify destination container 46 to receive the data packets 34. For example, destination container 46 may be selected from containers 14, 15, and 16 (FIG. 1). The load balancing rules 44 may distribute the data load of data packets 34 among any of the containers 14, 15, 16 running inside container hosts 10 and/or 12. As such, the load may be distributed across any of the container hosts 10, 12 in communication over the virtual network 108.

At 306, method 300 may include translating, at the data link layer, the source IP address of the at least one data packet to a local IP address of the container host. For example, load balancing component 43 may also use proxy component 50 to convert the source IP address of client 110 that transmitted the data packet 34 to a local IP address 35 of container host 10. Local IP address 35 may be fully virtualized so that the local IP address 35 may not be configured in the IP layer (e.g., Layer 3) or transport layer (e.g., Layer 4) of the container hosts 10, 12.

At 308, method 300 may include changing, at the data link layer, the destination IP address of the at least one data packet to a virtual IP address of the selected destination container so that the at least one data packet is transformed to a proxy data packet having a destination address of the virtual IP address of the destination container and a source address of the local IP address of the container host. For example, in an implementation, load balancing component 43 may also use a proxy component 50 operable to convert the destination IP address 36 of the received data packet 34 to the destination VIP address 48 of the selected destination container 46 so that the data packet 34 may be routed to the destination container 46 using the destination VIP address 48. Changing the destination IP address 36 for data packets 34 to the destination VIP address 48 allows any destination IP address 36 associated with container hosts 10, 12 to be used as a virtual IP address that can be routed to any container 14, 15, and 16 communicating over the virtual network 108.

At 310, method 300 may include receiving, from the destination container, a proxy data response packet. Management component 20 may receive a proxy data packet response 52 from destination container 46 in response to the proxy data packet 51 received from container host 10. The proxy data packet response 52 may identify the local IP address 35 of container host 10 as the destination of the proxy data packet response 52. In addition, the proxy data packet response 52 may identify the destination VIP address 48 of the destination container 46 as the source of the proxy data packet response 52.

At 312, method 300 may include transforming the proxy data response packet to a data response packet that identifies a source address of the client as the destination address of the data response packet. Proxy component 50 may apply one or more rules to identify a source address of the client 110. The rules may be stateful rules that remember the changes made to the destination and source addresses of data packet 34 during the load balancing on Layer 2 within the virtual network. Proxy component 50 may replace the local IP address 35 of container host 10 with the destination IP address 36 of container host 10. In addition, proxy component 50 may replace the destination VIP address 48 of the destination container 46 with the source VIP address 42 of client 110. Thus, the data packet response 54 may indicate the source VIP address 42 of client 110 as the destination address and the destination IP address 36 of container host 10 as the source of the data packet response 54. As such, the data packet response 54 may be routed back to client 110 that transmitted the data packet 34 from the external network 104.

Referring now to FIG. 4, which is also discussed with reference to FIG. 1, example changes to the address headers 402, 410, 420, and 430 of the data packet 34, proxy data packet 51, the proxy data packet response 52, and the data packet response 54 by management component 20 when operating according to method 300 are illustrated. Also, referring to FIG. 1 with respect to the addressing formats, the load balancing container hosts 10, 12 have IP addresses of 10.10.10.200 and 10.10.10.201, but the VIP address of the corresponding management components 20, 21 (and respective load balancing components 43) are 2.2.2.2:80, and the backend containers 14, 15, 16 have DIPS of 192.168.1.5, 192.168.1.6 and 192.168.1.7, respectively. In the illustrated example of FIG. 4, the source VIP address of client 110 is 1.1.1.1 and the virtual IP address of container host 10 is 2.2.2.2 with port 80. In addition, in the illustrated example of FIG. 1, container 14 has a destination container VIP address of 192.168.1.5:8000, container 15 has a destination container VIP address of 192.168.1.6:8000, and container 16 has a destination container VIP address of 192.168.1.6:8000.

External client 110 may send data packet 34 to virtual IP address 40 (FIG. 1) of container host 10. The physical network may route data packet 34 to any of the container hosts 10 and 12 in communication on virtual network 108 since, in this example, both container host 10 and container host 12 have virtual IP addresses 40 and 41 of 2.2.2.2 with port 80 (see FIG. 1). Data packet 34 includes address header 402 having a source medium access control (MAC) address 402 of 1.1.1.1, a destination MAC address 404 of 2.2.2.2, a source VIP address 406 of 1.1.1.1:9000, and a destination VIP address 408 of 2.2.2.2:80. In the illustrated example, the physical network may route data packet 34 to container host 10 based on the destination VIP address 408 of data packet 34.

At container host 10, management component 20 may create proxy data packet 51, as discussed above in reference to FIGS. 1-3, to send to a selected one (based on load balancing rules) of the containers 14, 15, or 16. Proxy data packet 51 includes address header 410 having a source MAC address 412 of the local host (e.g., a proxy address of container host 10), a destination MAC address 414 of 192.168.1.5., a source VIP address 416 of 192.168.1.8:8686, and a destination VIP address 418 of 192.168.1.5:8000. Thus, management component 20 may transmit proxy data packet 51 to the destination VIP address 418 of the selected backend container. Both the destination virtual IP address 418 and the source VIP address 416 are fully virtualized and not configured in the IP layer (e.g., Layer 3) or the transport layer (e.g., Layer 4) of any of the container hosts 10, 12.

The backend container, e.g., the selected one of containers 14, 15, 16, may generate proxy data packet response 52. Proxy data packet response 52 includes address header 420 having a source MAC address 422 of 192.168.1.5, a destination MAC address 424 of the local host (e.g., a proxy address of container host 10), a source VIP address 426 of 192.168.1.5:8000, and a destination VIP address 428 of 192.168.1.8:8686. When the backend container sends the address resolution protocol (ARP) for the virtual IP 192.168.1.8, container host 10 will respond with the MAC address of 10.10.10.200 such that the proxy data packet response 52 comes back to container host 10.

Management component 20 may receive the proxy data packet response 52 and may apply one or more rules to create data packet response 54 to transmit to client 110. Data packet response 54 includes address header 430 having a source MAC address 432 of the local host, a destination MAC address 434 of 1.1.1.1, a source VIP address 436 of 2.2.2.2:80, and a destination VIP address 438 of 1.1.1.1: 9000. The one or more rules may be stateful rules in Layer 2 of container host 10 that identify client 110 as the source of data packet 34 so that data packet response 54 may be transmitted to client 110. As such, data packet response 54 may be transformed in the data link layer (e.g., Layer 2) of container host 10.

In addition, it should be noted that by using system 100 to perform non-direct source routing and performing the load balancing in Layer 2, system 100 may provide the functionality to load balance a VIP which is actually not assigned to any of the nodes since system 100 captures the packet in Layer 2 and proxies the packet to a selected endpoint. As such, in a single configuration, system 100 supports load balancing, enabling a load balanced connection to a proxy using specific IP, and provides functionality to use any IP as a VIP which can be routed to a machine. Thus, system 100 solves a problem by avoiding configuring the VIPs in Layer 3 or above. Moreover, it saves the cost of performing all these tasks discussed in this disclosure in Layer 3 and/or Layer 4. In addition, a user does not need to handle any of the network configuration on the container hosts for VIPs.

In an example implementation in WINDOWS operating system, for example, management component 20 may be implemented using the vmswitch extension driver in windows (VFP). From the HNS APIs, a new interface may be added for the load balancer configuration. Except in the standard load balancer configuration, the user may specify a source VIP and a VIP. The Source VIP is the proxy IP used to send the packets to the selected dynamic IP address (DIP). In the case of an overlay network, the system does not need to care about the network (routing) configuration, so as described herein the source IP address may be added in a local machine as a reserved IP whose medium access control (MAC) address is the same as the MAC address of management component 20. The user may put this source VIP as remote endpoint to all clustered container hosts 10, 12. VIP, by default may be the management IP address used for the destination VIP, which allows the performance of the distributed load balancing. Distributed load balancing may include a connection that enables transmitting the data packet to any node of container host cluster. And if a user specifies an address different from the local management component IP address, the load balancing may be configured accordingly. For this case, the system is setup so that the physical routers deliver the packets for VIP to one of the container hosts 10, 12, and preserving the VIP in packet while delivering it to the container host.

Figure 5:
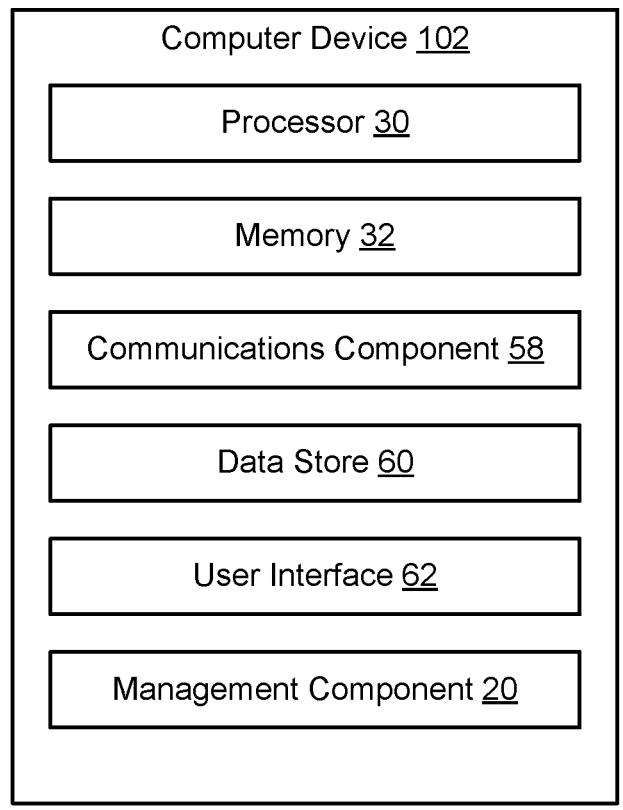
FIG. 5 is a schematic block diagram of an example computer device in accordance with an implementation of the present disclosure.

Referring now to FIG. 5, illustrated is an example computer device 102 in accordance with an implementation, including additional component details as compared to FIG. 1. In one example, computer device 102 may include processor 30 for carrying out processing functions associated with one or more of components and functions described herein. Processor 30 can include a single or multiple set of processors or multi-core processors. Moreover, processor 30 can be implemented as an integrated processing system and/or a distributed processing system.

Computer device 102 may further include memory 32, such as for storing local versions of applications being executed by processor 30. Memory 32 can include a type of memory usable by a computer, such as random access memory (RAM), read only memory (ROM), tapes, magnetic discs, optical discs, volatile memory, non-volatile memory, and any combination thereof. Additionally, processor 30 and memory 32 may include and execute container hosts 10, 12 (FIG. 1).

Further, computer device 102 may include a communications component 58 that provides for establishing and maintaining communications with one or more parties utilizing hardware, software, and services as described herein. Communications component 58 may carry communications between components on computer device 102, as well as between computer device 102 and external devices, such as devices located across a communications network and/or devices serially or locally connected to computer device 102. For example, communications component 58 may include one or more buses, and may further include transmit chain components and receive chain components associated with a transmitter and receiver, respectively, operable for interfacing with external devices.

Additionally, computer device 102 may include a data store 60, which can be any suitable combination of hardware and/or software, that provides for mass storage of information, databases, and programs employed in connection with implementations described herein. For example, data store 60 may be a data repository for management component 20 (FIG. 1).

Computer device 102 may also include a user interface component 62 operable to receive inputs from a user of computer device 102 and further operable to generate outputs for presentation to the user. User interface component 62 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 62 may include one or more output devices, including but not limited to a display, a speaker, a haptic feedback mechanism, a printer, any other mechanism capable of presenting an output to a user, or any combination thereof.

In an implementation, user interface component 62 may transmit and/or receive messages corresponding to the operation of management component 20. In addition, processor 30 executes management component 20 or data store 60 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory;
   a management component associated with a virtual switch of the computer device in communication with the memory and the processor, wherein the management component is operable to:
   receive at least one data packet at a container host on the computer device based on a destination IP address of the at least one data packet, wherein the destination IP address corresponds to a plurality of container hosts;
   select, at a data link layer of the container host, a destination container from one or more container hosts on the computer device and other computer devices in communication with the computer device over a virtual network to balance a data load;
   translate, at the data link layer, a source IP address of the at least one data packet to a local IP address of the container host; and
   change, at the data link layer, the destination IP address of the at least one data packet to a virtual IP address of the destination container so that the at least one data packet is transformed to a proxy data packet having a destination address of the virtual IP address of the destination container and a source address of the local IP address of the container host.

2. The computer device of claim 1, wherein the destination address of the at least one data packet corresponds to a physical network address of a source container host or a virtual IP address of the source container host.

3. The computer device of claim 1, wherein local IP address is a virtualized addressed.

4. The computer device of claim 3, wherein the local IP address is contained within the data link layer.

5. The computer device of claim 1, wherein the management component is further operable to:
   receive, from the selected destination container, a proxy data response packet corresponding to the at least one data packet;
   identify a client that originally transmitted the at least one data packet based on the destination address of the proxy data response packet; and
   transform the proxy data response packet to a data response packet that identifies a source address of the client as the destination address of the data response packet.

6. The computer device of claim 5, wherein the management component is further operable to transform the proxy data response packet by applying one or more rules to reverse changes to a destination address of the proxy data response packet.

7. The computer device of claim 1, wherein the management component is further operable to select the destination container by applying one or more load balancing rules.

8. The computer device of claim 7, wherein the one or more load balancing rules comprise one or more of load balancing relative to a threshold, load balancing relative to an average usage, source hash load balancing, round robin load balancing, and a least number of connections load balancing.

9. A method for load balancing of connections, comprising:
   receiving, at a management component on a container host on a computer device, at least one data packet based on a destination IP address of the at least one data packet, wherein the destination IP address corresponds to a plurality of container hosts;
   selecting, at a data link layer of the container host, a destination container from one or more container hosts on the computer device and other computer devices in communication with the computer device over a virtual network to balance a data load;
   translating, at the data link layer, a source IP address of the at least one data packet to a local IP address of the container host; and
   changing, at the data link layer, the destination IP address of the at least one data packet to a virtual IP address of the destination container so that the at least one data packet is transformed to a proxy data packet having a destination address of the virtual IP address of the destination container and a source address of the local IP address of the container host.

10. The method of claim 9, wherein the destination address of the at least one data packet corresponds to a physical network address of a source container host or a virtual IP address of the source container host.

11. The method of claim 9, wherein local IP address is a virtualized addressed.

12. The method of claim 11, wherein the local IP address is contained within the data link layer.

13. The method of claim 9, further comprising:
   receiving, from the selected destination container, a proxy data response packet corresponding to the at least one data packet;

identifying a client that originally transmitted the at least one data packet based on the destination address of the proxy data response packet; and transforming the proxy data response packet to a data response packet that identifies a source address of the client as the destination address of the data response packet.

14. The method of claim 13, wherein transforming the proxy data response packet further comprises applying one or more rules to reverse changes to a destination address of the proxy data response packet.

15. The method of claim 9, wherein selecting the destination container further comprises applying one or more load balancing rules.

16. The method of claim 15, wherein the one or more load balancing rules comprise one or more of load balancing relative to a threshold, load balancing relative to an average usage, source hash load balancing, round robin load balancing, and a least number of connections load balancing.

17. A non-transitory computer-readable medium storing instructions executable by a computer device, comprising:

at least one instruction for causing the computer device to receive at least one data packet at a container host on the computer device based on a destination IP address of the at least one data packet, wherein the destination IP address corresponds to a plurality of container hosts;

at least one instruction for causing the computer device to select, at a data link layer of the container host, a destination container from one or more container hosts on the computer device and other computer devices in communication with the computer device over a virtual network to balance a data load;

at least one instruction for causing the computer device to translate, at the data link layer, a source IP address of the at least one data packet to a local IP address of the container host; and at least one instruction for causing the computer device to change, at the data link layer, the destination IP address of the at least one data packet to a virtual IP address of the destination container so that the at least one data packet is transformed to a proxy data packet having a destination address of the virtual IP address of the destination container and a source address of the local IP address of the container host.

* * * * *